United States Patent
Balakrishnan et al.

(10) Patent No.: US 6,424,499 B1
(45) Date of Patent: Jul. 23, 2002

(54) FLEXIBLE TRACE INTERCONNECT ARRAY FOR MULTI-CHANNEL TAPE HEAD

(75) Inventors: Arun Balakrishnan, Lafayette; Gregory P. Hertrich, Longmont; Mark Sheppard, Louisville; Doug Gunther, Westminster, all of CO (US)

(73) Assignee: Quantum Corporation, Milpitas, CA (US)

( * ) Notice: Subject to any disclaimer, the term of this patent is extended or adjusted under 35 U.S.C. 154(b) by 0 days.

(21) Appl. No.: 09/283,313

(22) Filed: Mar. 31, 1999

(51) Int. Cl.[7] .................................................. G11B 5/48
(52) U.S. Cl. .................................. 360/245.9; 360/261.1
(58) Field of Search ........................... 360/264.2, 266.3, 360/281.7, 245.8, 245.9, 246, 291, 261.1; 174/117 F, 117 FF, 254, 268

(56) References Cited

U.S. PATENT DOCUMENTS

| | | | | |
|---|---|---|---|---|
| 5,134,252 A | * | 7/1992 | Himeno et al. | 174/268 |
| 5,606,477 A | * | 2/1997 | Erpelding et al. | 360/245.8 |
| 5,608,591 A | * | 3/1997 | Klaassen | 360/245.9 |
| 5,694,270 A | * | 12/1997 | Sone et al. | 360/245.9 |
| 5,737,152 A | | 4/1998 | Balakrishnan | 360/245.9 |
| 5,754,369 A | | 5/1998 | Balakrishnan | 360/264.2 |
| 5,812,344 A | * | 9/1998 | Balakrishnan | 360/245.9 |
| 5,818,662 A | * | 10/1998 | Shum | 360/245.9 |
| 5,862,010 A | * | 1/1999 | Simmons et al. | 360/97.01 |
| 5,862,014 A | | 1/1999 | Nute | 360/261.1 |
| 5,864,446 A | * | 1/1999 | Endo et al. | 360/264.2 |

* cited by examiner

*Primary Examiner*—David L. Ometz
(74) *Attorney, Agent, or Firm*—Steven G. Roeder; Law Office of Steven Roeder (57) ABSTRACT

A flexible multi-channel trace interconnect array has a head end for electrically connecting write and read trace pairs respectively to write and read elements of a data transducer head, a body formed of a flexible dielectric material and carrying the write and read trace pairs, and at least one circuit end for connecting the write and read trace pairs respectively to write driver and read preamplifier circuits of a data storage device. Each trace pair includes two trace conductors each having a trace width, and an inter-conductor separation space. Adjacent trace pairs are separated by an inter-pair space having a width greater than, and preferably two to twenty times greater than the inter-conductor separation space in order to decouple adjacent channel pairs.

25 Claims, 6 Drawing Sheets

FLEXIBLE TRACE INTERCONNECT ARRAY FOR MULTI-CHANNEL TAPE HEAD

FIELD OF THE INVENTION

The present invention relates to flex circuits for connecting magnetic heads to read and write circuits of a magnetic recording device. More particularly, the present invention relates to a flexible trace interconnect array for a multi-channel tape head which manifests reduced inter-channel cross talk as well as controlled electrical impedance characteristics.

BACKGROUND OF THE INVENTION

Magnetic tape drives are typically employed to provide data backup and archival storage for user data records and programs. For digital data storage applications, tape drives typically employ either rotating heads, or non-rotating heads. One form of non-rotating head is the streaming tape drive. In a streaming tape drive multiple blocks of user data are typically written to tape in a single streaming operation, rather than in a series of start-stop operations of the tape transport. In the streaming tape drive, a magnetic tape head includes at least one read/write element. The head is typically positioned laterally relative to the tape path by a lead screw, which is controllably rotated by e.g. a stepper motor, or an equivalent arrangement. In this manner a single transducer element, or several spaced-apart elements, may write to, and read from, a multiplicity of linear tracks defined along the magnetic recording tape.

In order to permit the head to be moved laterally across the tape in order to confront the multiple parallel tape tracks, a flexible head interconnect arrangement is needed to connect the read/write elements of the head to electronic circuitry conventionally mounted on one or more printed circuit boards affixed to the tape drive base or housing. In the past, flexible wires, twisted together into pairs and gathered into a cable, have been employed as tape head interconnects.

Digital linear magnetic tape drives are an improved type of linear streaming magnetic tape drives. One well established digital linear magnetic tape drive is provided by Quantum Corporation as the DLT-7000 drive. This particular tape drive uses a single reel tape cartridge that supplies a stream of half-inch-wide tape via a leader and buckling mechanism. The Quantum DLT7000 tape drive has a four-channel head, with eight write elements and four read elements. A first set of four write elements are placed on one side of the four read elements, and a second set of four write elements are placed on an opposite side of the first set. This particular arrangement enables four data tracks to be written and then read-checked during a single forward tape streaming operation, and a second four data tracks to be written and read-checked during a single reverse tape streaming operation. Azimuth recording is employed to reduce cross talk between adjacent tape tracks. Therefore, the head is not only displaced laterally relative to the tape path, it is also rotated to a forward azimuth angle for forward direction, and rotated to a reverse azimuth angle for reverse direction data recording. Backward compatibility is achieved by orienting the head at a right angle to the tape path such that two non-azimuthal tracks may be simultaneously written and/or read during each tape streaming operation.

A flex circuit supporting the eight write elements and the four read elements of the Quantum DLT7000 tape drive product is described in commonly assigned U.S. Pat. No. 5,862,014 to Nute, entitled: "Multi-Channel Magnetic Tape Head Module Including Flex Circuit", the disclosure thereof being incorporated herein by reference. The described flex circuit permitted the tape head freely to be laterally displaced and also to be rotated to the variously available azimuthal and linear tape confronting positions. In the arrangement described in the '014 patent, approximately 128 linear data tracks were provided on the half-inch recording tape.

Data rates and track densities are increasing. One way to increase data rate of a magnetic recording system is to increase the write frequency. Another way to increase data rate is to increase the number of parallel write and read elements of the head and data channels of the tape drive so that more tracks are simultaneously written during each tape streaming operation. A third way to increase data rates is to employ partial response, maximum likelihood signaling techniques of the type known in magnetic disk drives.

One way to increase track density is to reduce linear track width and spacing by aligning the write elements/read elements closer together. By employing thin film inductive write elements and magneto-resistive read elements, it is practical to increase the number of data tracks of a one-half inch magnetic recording tape from e.g., 128 tracks to e.g., 1000 or more tracks. Since the head carrying the write and read elements must still be displaced laterally relative to the tape path, a flexible interconnect arrangement is needed in order to connect the write and read elements of the movable head to write and read electronics affixed to the printed circuit board of the drive electronics.

A flex trace interconnect array is preferred, because it affords the opportunity to control the electrical impedance characteristics of the traces, as taught for example by commonly assigned U.S. Pat. No. 5,737,152 to Balakrishnan, entitled: "Suspension with Multi-Layered Integrated Conductor Trace Array for Optimized Electrical Parameters", the disclosure thereof being incorporated herein by reference. Commonly assigned U.S. Pat. No. 5,754,369 to Balakrishnan, entitled: "Head Suspension with Self-Shielding Integrated Conductor Trace Array", shows an arrangement wherein a read conductor pair is interleaved between two conductors of a write conductor pair in a disk drive flexible trace interconnect. (In disk drive operations, simultaneous writing and reading operations are not usually present, and thus the write traces offer a measure of shielding to the read traces during disk drive data reading operations). The disclosure of the '369 patent is also incorporated by reference herein.

Conventionally, the trace conductors connecting the preamplifiers to the read elements of the tape head are interleaved with the conductors connecting the write drivers to the write elements. Because of space restrictions, and the desire to reduce the interconnect mass, the trace conductors have to be placed close to each other. While it is desirable from an electrical viewpoint to space the conductors of any single channel as close to each other as possible, it is equally desirable to increase the spacing between adjacent conductors of separate channels.

Figure 1:
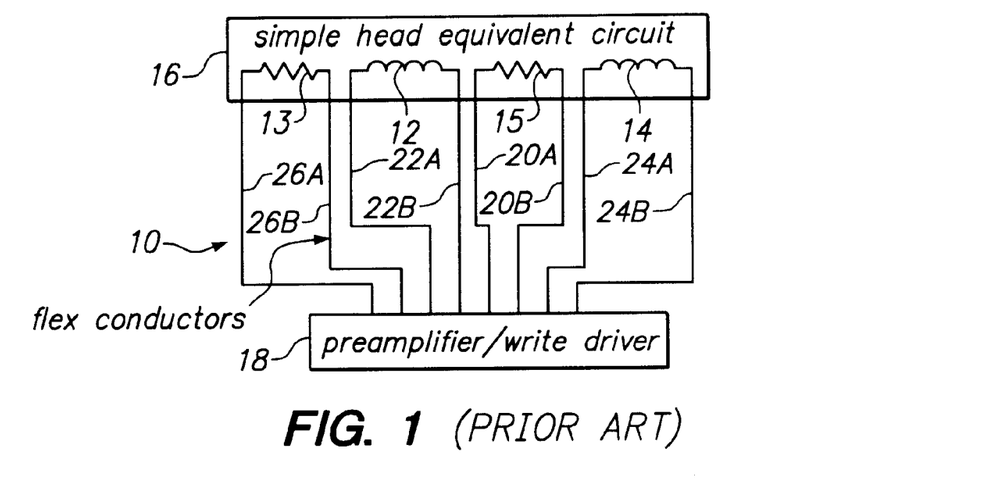
FIG. 1 is an electrical circuit schematic diagram of a flexible trace interconnect array for interconnecting a two-channel write/read tape head with associated write driver/read preamplifier circuitry of a tape drive in accordance with established, conventional principles.
Figure 3A:
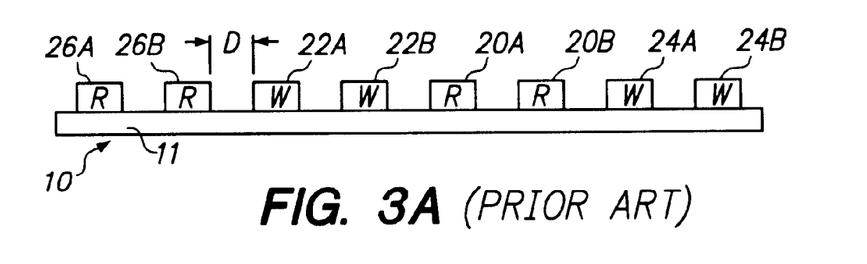
FIG. 3A is greatly enlarged view in elevation and cross section of a trace array in accordance with the FIG. 1 example.

FIG. 1 and FIG. 3A show a conventional layout of flex conductors on a flexible trace interconnect array 10 which connects two inductive write elements 12 and 14 and two magneto-resistive read elements 13 and 15 of a two-channel tape head 16 to a two-channel preamplifier/write driver circuit 18 of the tape drive. In this example one tape channel (track) is defined by write element 12 and read element 13, and another tape channel (track) is defined by write element 14 and read element 15. Further, in the FIG. 1 simplified example a conductor pair 20A–20B of flex interconnect 10 connecting read transducer 15 to its preamplifier in circuit 18 is interleaved between a conductor pair 22A–22B connecting write transducer 12 to its write driver in circuit 18 and a conductor pair 24A–24B connecting write transducer 14 to its write driver in circuit 18.

Flexible trace interconnects are presently available having trace widths as narrow as 75 μm (approximately 3 mils). Thus, in the FIG. 1 multi-channel flex interconnect 10 a flex trace interconnect conductor geometry would have a cross-sectional layout of traces formed on a flexible substrate 11 as shown in FIG. 3A: - - - 75 μm read trace 26A - - - 75 μm inter-conductor space - - - 75 μm read trace 26B - - - 75 μm inter-pair space - - - 75 μm write trace 22A - - - 75 μm inter-conductor space - - - 75 μm write trace 22B - - - 75 μm inter-pair space - - - 75 μm read trace 20A - - - 75 μm inter-conductor space - - - 75 μm read trace 20B - - - 75 μm inter-pair space - - - 75 μm write trace 24A - - - 75 μm inter-conductor space - - - 75 μm write trace 24B, etc. The conductors of trace pairs 20, 22, 24, and 26 could be widened or thickened, or both, if required for electrical reasons.

Figure 2:
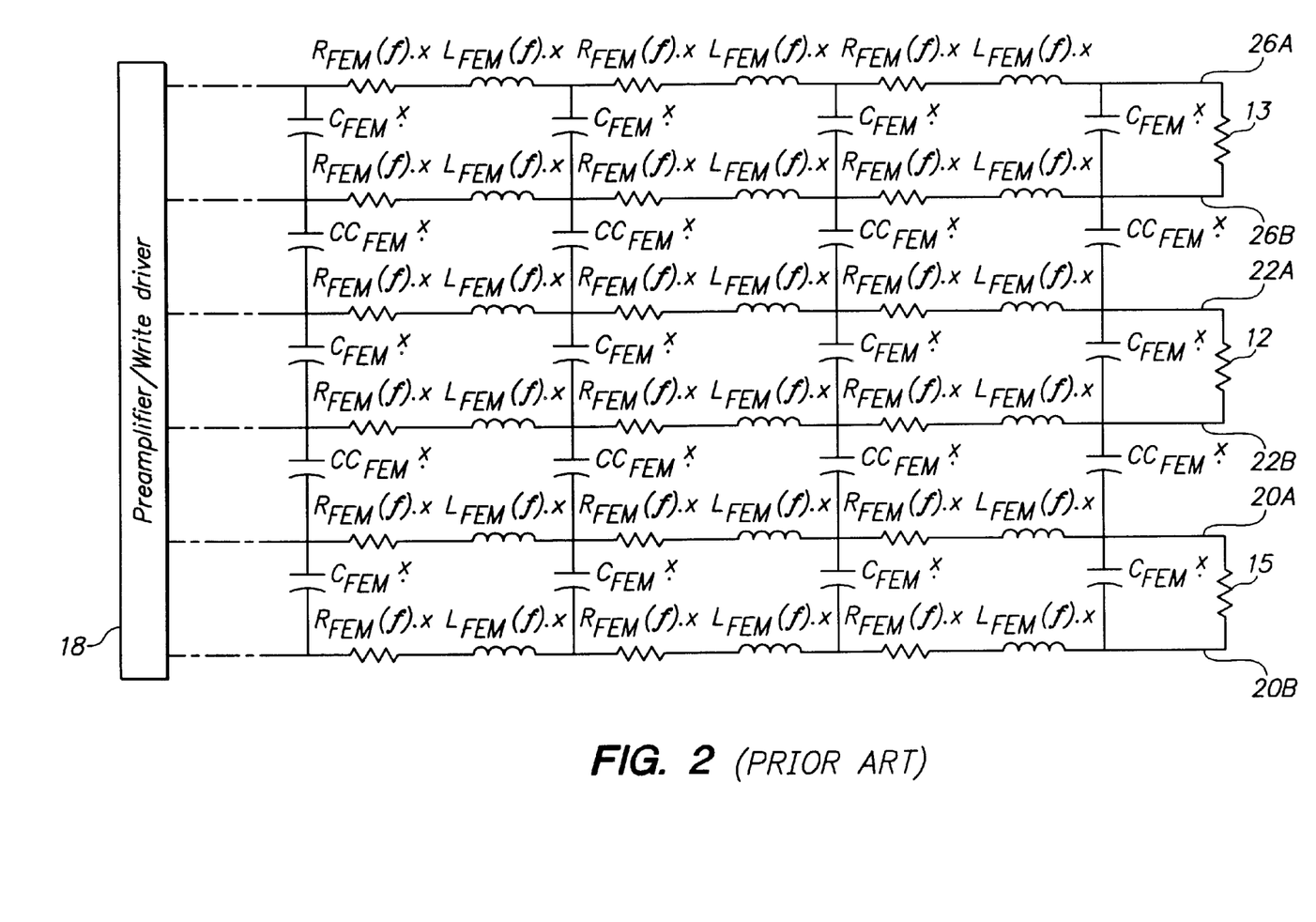
FIG. 2 is schematic circuit drawing of an equivalent circuit of a representative portion of the FIG. 1 flexible trace interconnect array.

Each conductor in the FIG. 1 electrical schematic diagram has a resistance, an inductance and a capacitance associated with it. An equivalent circuit for three of the conductor pairs of FIG. 1 is shown in FIG. 2. The FIG. 2 equivalent circuit shows the pair of write-channel conductors 22A, 22B routed between the adjacent conductors 20B and 26A of the two read circuits. There are a number of factors that need to be considered. At higher write current frequencies, the resistance and inductance parameters are governed by skin-effect and proximity-effect phenomena. The resistance is affected by the current distribution in the trace conductors, which tends to move to the surface of each trace conductor at high frequencies. This movement of the current distribution effectively results in a smaller conductor cross section available for the current to flow through, and results in an increase in the high frequency electrical resistance of the trace conductor. The current-density vector and the magnetic flux follow the same movement toward the conductor surface. As the current moves towards the surface, so does the magnetic flux, which for the same current means lesser flux links the conductor. Thus, the electrical inductance of the trace conductor goes down with increasing frequency. The inter-trace capacitances are relatively frequency-independent and may be treated as constant values.

In addition to the parameters discussed above, the FIG. 2 equivalent circuit also includes elements that couple the trace conductors 22A and 22B of the write circuit with the conductors 26B and 20A of the two adjacent read circuits. This coupling is shown in FIG. 2 as coupling capacitors $CC_{FEM}$·x. The mere presence of the adjacent conductors also affects the flux distribution of the current in the current-carrying conductors. Since this is a frequency-dependent phenomenon, different signals at different frequencies are affected to varying degree.

Another impact of the write conductors 22A and 22B on the read conductors 26B and 20A is due to the fact that the write current amplitude is approximately 40 to 60 milliamperes, whereas the read signals are on the order of one to a few millivolts. During simultaneous writing/read-checking operations of the tape drive, any signals induced by the write current on adjacent read conductors can couple into the read signal at the preamplifier.

The cross-coupling of write and read conductive traces and the disparity in write current levels to read signal levels suggests that the read and write signals need to be decoupled.

SUMMARY OF THE INVENTION WITH OBJECTS

The present invention solves this problem within a flexible trace interconnect array for a multi-channel recording and playback head, such as a digital linear magnetic tape head.

One object of the present invention is to provide a multi-channel flexible trace interconnect array of trace pairs in which each trace pair is electrically decoupled from adjacently located trace pairs along the trace array.

Another object is to reduce cross talk and eddy current induction between pairs of conductive traces formed on a flexible circuit substrate used to interconnect transducer elements of a positionable head with write driver and read preamplifier circuitry non-moveably affixed to a base of a data storage device, such as a tape drive.

In accordance with one aspect of the principles of the present invention, a flexible multi-channel trace interconnect array is provided. The array has a head end for electrically connecting write and read trace pairs respectively to write and read elements of a data transducer head. The array includes a body formed of a flexible dielectric material which carries the write and read trace pairs and leads to a circuit connection end for connecting the write and read trace pairs respectively to write driver and read preamplifier circuits of a data storage device, such as a multi-channel tape drive. Each trace pair comprises two trace conductors, and each conductor has a defined trace width, such as 50 μm. The conductors of each pair are separated along the body by an inter-conductor space having a defined width such as 50 μm. Adjacent trace pairs are separated by an inter-pair space having a defined width which is greater than the defined trace width and greater than the defined inter-conductor space, such as 150 μm–400 μm, or more. Preferably, the inter-pair space has a defined width dimension lying in a range from approximately two to twenty times the inter-conductor defined width.

In one preferred arrangement multiple read trace pairs, such as at least twelve read trace pairs, are interleaved with multiple write trace pairs, such as at least twelve write trace pairs, along the trace array body.

In an alternative preferred arrangement, multiple write trace pairs are separated into a write pair group and multiple read trace pairs are separated into a read pair group. In this arrangement the write pair group is substantially spaced away from the read pair group along the array body. In a related preferred arrangement trace array body is divided into two elongated segments including a write group segment carrying the write group trace pairs, and a read group segment carrying the read group pairs. In a further related preferred arrangement the write group segment includes a portion leading to the write group circuit connection end which diverges away, preferably perpendicularly from the body and in an opposite direction of divergence away from the body of a portion of the read group segment leading to the read group circuit connection end. Preferably, although not necessarily, the write group segment portion has a length which is approximately equal to a length of the read group segment portion.

Furthermore, in this alternative preferred arrangement, each write element and a corresponding read element of the head are aligned to write and read a single storage track of a data storage medium such as magnetic tape. Accordingly, the head end of the array comprises a pattern of plate-through vias and bridging traces formed on an opposite side of the flex body so that a write pair connection location to a write element of the head is placed adjacent to a read pair connection location to the corresponding read element of the head.

These and other objects, advantages, aspects, and features of the present invention will be more fully appreciated and understood upon consideration of the following detailed description of preferred embodiments presented in conjunction with the accompanying drawings.

DETAILED DESCRIPTION OF PREFERRED EMBODIMENTS

In accordance with principles of the present invention, by employing controlled fine-line (conductive trace width and space) trace interconnect manufacturing techniques used to make hard disk trace interconnect arrays, flexible multi-channel trace interconnects for storage devices such as multi-channel tape drives may be realized which reduce spacing between conductors of the same channel and which increase spacing between adjacent conductors of separate channels. A representative tape drive is disclosed in the Nute U.S. Pat. No. 5,862,014, previously referenced and incorporated herein.

For example, by moving to a minimum conductor trace widths and inter-conductor spacing to 50 $\mu$m from 75 $\mu$m, additional inter-pair separation space between adjacent conductors of separate channel trace pairs can be effectively realized without increasing overall width of the flexible body supporting the trace array. A more desirable spacing can therefore be provided for a multi-channel flexible trace interconnect array over the conventional trace array 10 shown in FIGS. 1 and 3A.

Figure 3B:
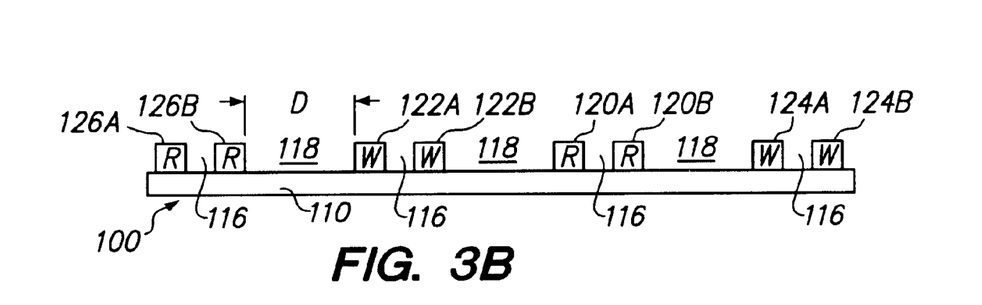
FIG. 3B is a greatly enlarged view in elevation and cross section of a multi-channel flexible trace array in accordance with principles of the present invention.

In accordance with principles of the present invention and as shown in FIG. 3B, a new trace interconnect array 100 formed upon a suitable flexible dielectric substrate 110 may therefore follow an exemplary geometric cross-sectional layout of: - - - 50 $\mu$m read trace 126A - - - 50 $\mu$m inter-conductor space 116 - - - 50 $\mu$m read trace 126B - - - 150 $\mu$m inter-pair separation space 118 - - - 50 $\mu$m write trace 122A - - - 50 $\mu$m inter-conductor space 116 - - - 50 $\mu$m write trace 122B - - - 150 $\mu$m inter-pair separation space 118 - - - 50 $\mu$m read trace 120A - - - 50 $\mu$m inter-conductor space 116 - - - 50 $\mu$m read trace 120B - - - 150 $\mu$m inter-pair separation space 118 - - - 50 $\mu$m write trace 124A - - - 50 $\mu$m inter-conductor space 116 - - - 50 $\mu$m write trace 124B - - -, etc.

In the FIG. 3B example the overall width of the trace interconnect array 100 is slightly less than the width of the FIG. 1 trace interconnect array 10, while the pair-separation distance D between adjacent conductors of separate write and read pairs is increased to at least twice of what was provided in the FIG. 1 conventional approach. Ideally, the inter-pair separation space 118 lies in a range between two and twenty times the inter-conductor separation space 116. This improved arrangement as shown in the FIG. 3B cross section diagram illustrates the physical separation between adjacent conductor pairs, and results in desired electrical decoupling between adjacent conductor pairs. In the present example such decoupling provides reduced cross talk and eddy current induction between the conductor pairs 126, 122, 120 and 124.

Figure 4A:
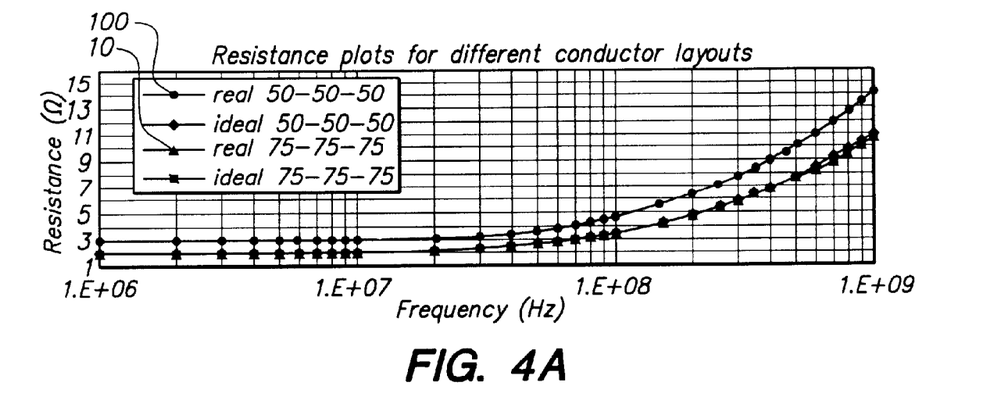
FIG. 4A is a family of simulation plots of trace conductor electrical resistance as a function of write current frequency for idealized and real trace arrays which compares the FIG. 3A and 3B examples.
Figure 4B:
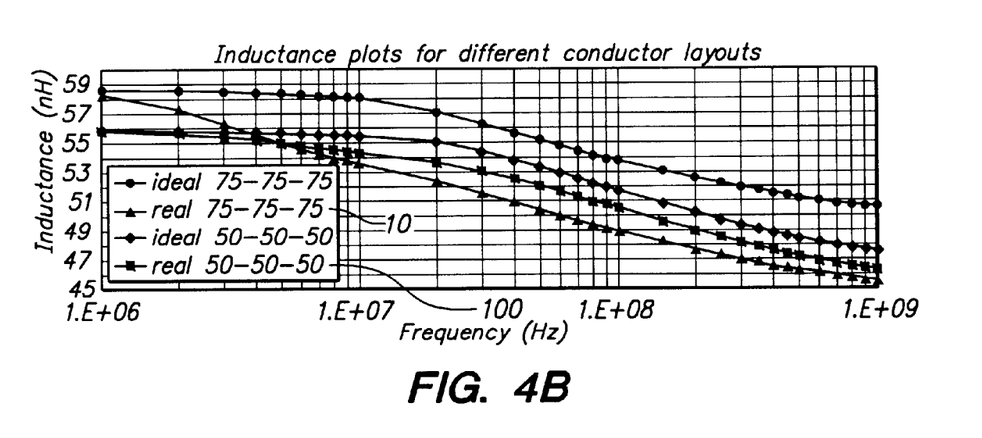
FIG. 4B is a family of simulation plots of trace conductor electrical inductance as a function of write current frequency for idealized and real trace arrays which compares the FIGS. 3A and 3B examples.
Figure 4C:
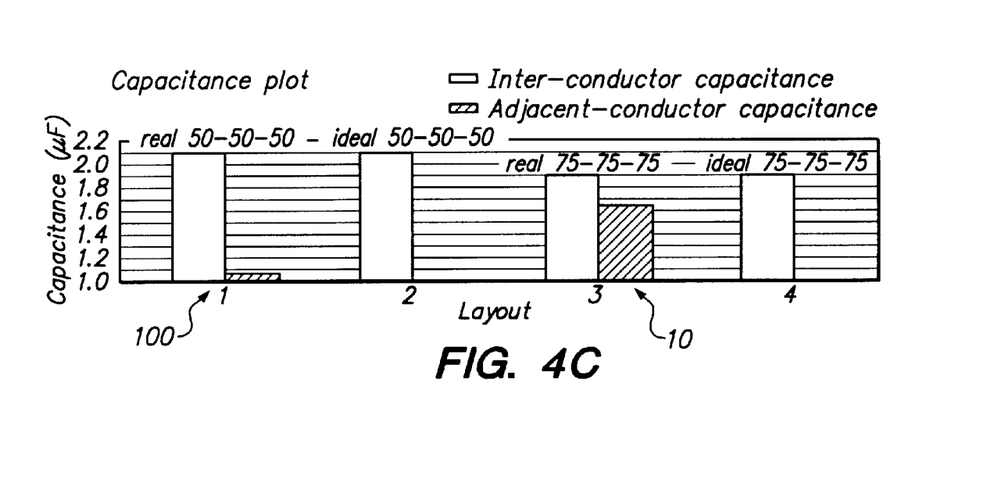
FIG. 4C is a series of graphs of simulation plots of inter-conductor capacitance as a function of layout for idealized trace arrays and for the trace arrays of FIGS. 3A and 3B.

FIGS. 4A, 4B and 4C present a comparison of electrical simulations for the FIG. 3A and FIG. 3B examples, as well as idealized cases of both geometries. The ideal case simulations consider only two conductors that are located in free space and completely away from any external influences. The ideal case is most desirable as there are no induced effects upon the idealized conductor pair. However, the real cases of the FIGS. 3A and 3B trace array examples 10 and 100 take into account the presence of the conductors of the adjacent channels.

The real FIG. 3A inductance plot of FIG. 4B shows the significant difference between the real and ideal cases which follow the conventional FIG. 3A geometry. The real FIG. 3B geometry inductance plot demonstrates the advantages in providing increased, e.g. 150 $\mu$m, separation between each conductor pair and the adjacent conductors of other conductor pairs. By following the FIG. 3B example 10 in lieu of the conventional FIG. 3A example 10, inter-pair capacitive coupling is also greatly reduced, e.g., from 1.7 pF to 1 pF, as shown in FIG. 4C.

Figures 5, 5A:
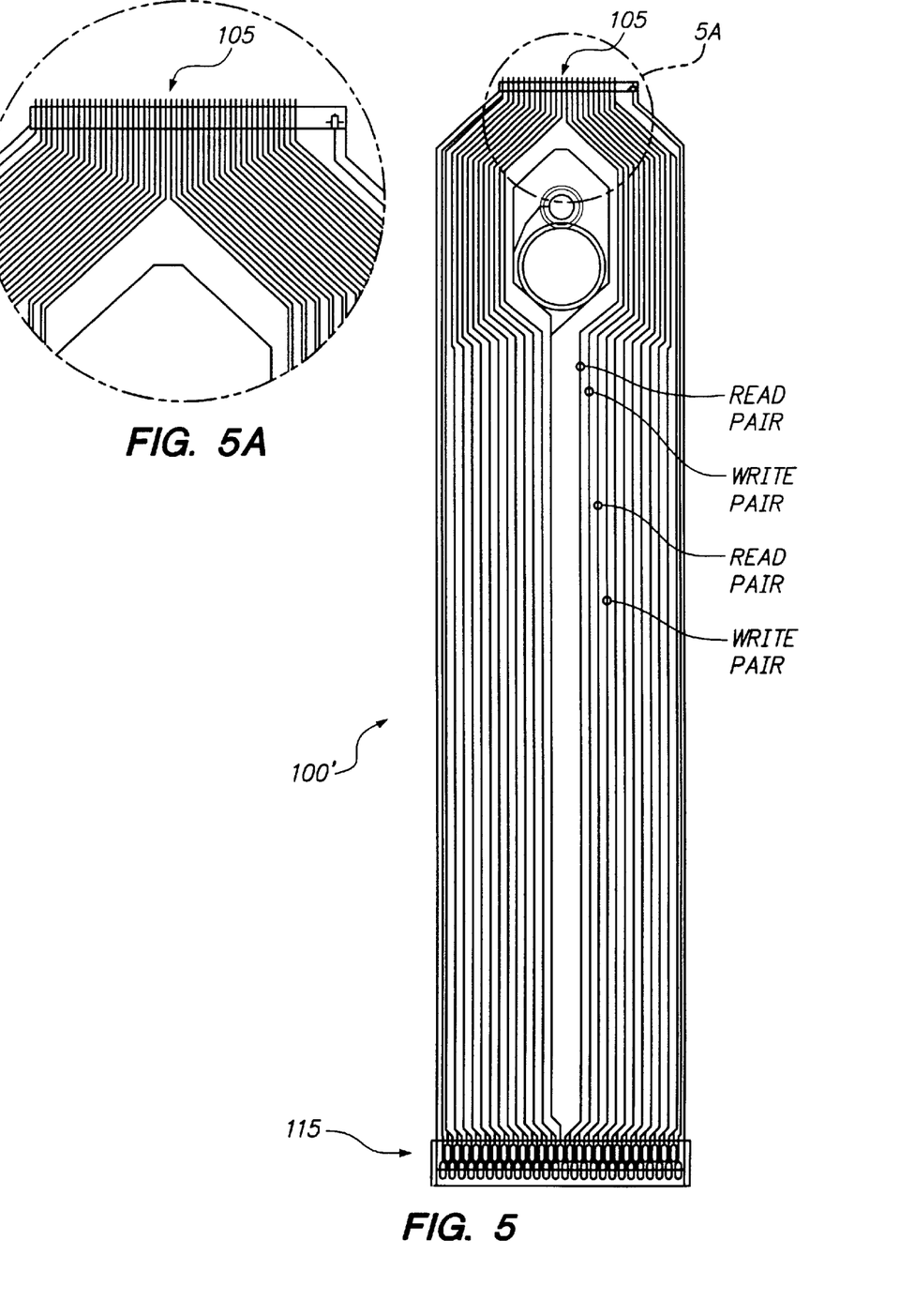
FIG. 5 is an enlarged plan view of a twelve-channel flexible trace interconnect array in accordance with principles of the present invention as illustrated in the FIG. 3B example.
FIG. 5A is an enlarged plan view of a head connect portion of the FIG. 5 array.

FIG. 5 illustrates a practical twelve-channel read and twelve-channel write flexible trace interconnect 100' incorporating the principles of the FIG. 3B example and extending from a head-connecting end 105 to a preamplifier/write driver circuit connection end 115. In the FIG. 5 example 100' the trace conductor width and spacing within each one of the twelve conductor pairs is 50 µm, while the distance D' between facing conductors of adjacent pairs is 400 µm, which further reduces the coupling and induced eddy-current effects over the FIG. 3B example 100 of the present invention. A head connection end 105 of the interconnect array 100' is shown in the enlarged plan view of FIG. 5A.

Figures 6, 6A:
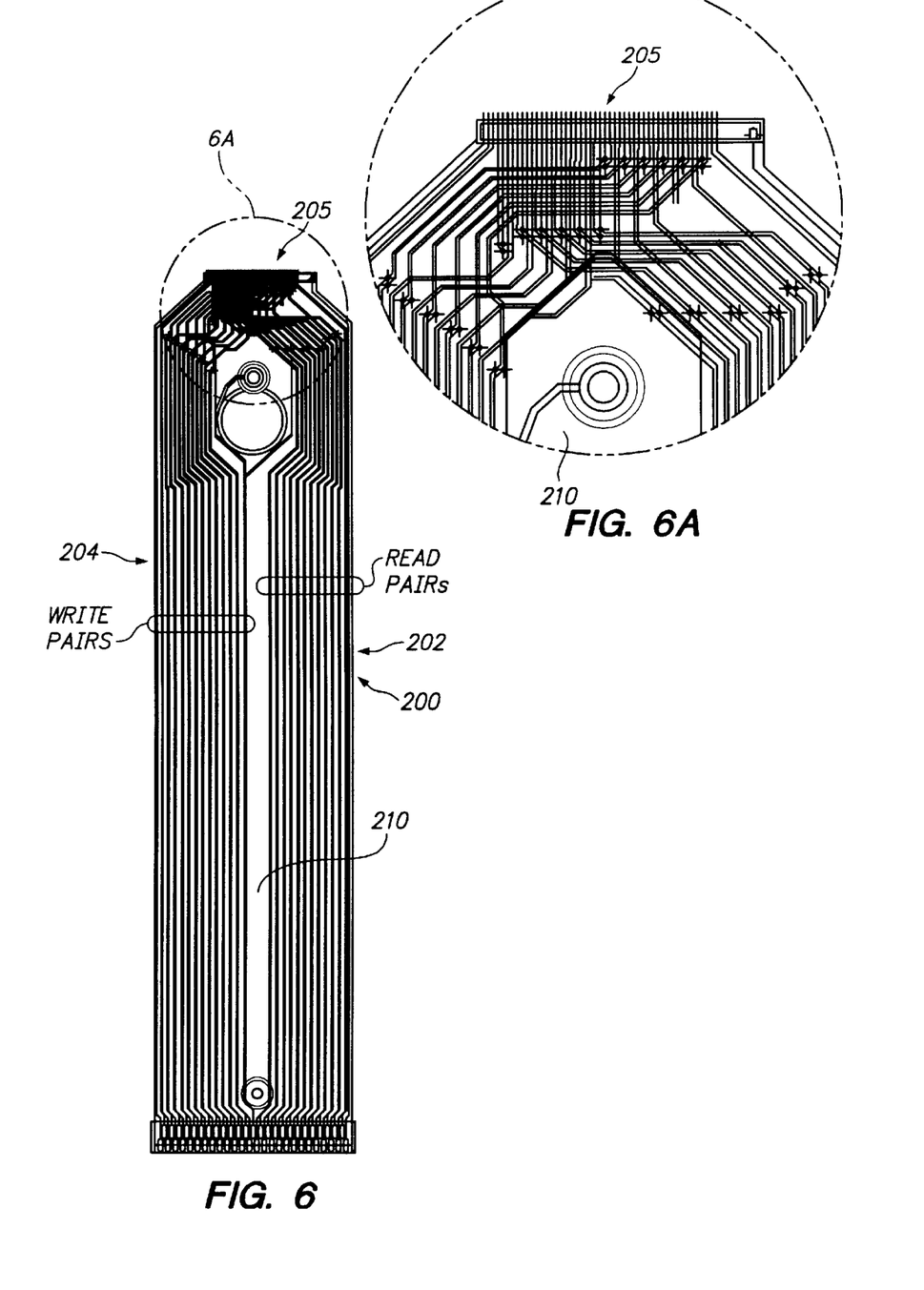
FIG. 6 is an enlarged plan view of a twelve-channel flexible trace interconnect array having read channel pairs grouped together and separated from a write channel pairs group in accordance with principles of the present invention.
FIG. 6A is an enlarged plan view of a head connect portion of the FIG. 6 array.

A further improvement 200 is realized by the FIG. 6 example 200. The FIG. 6 trace interconnect array 200 improves the FIG. 5 trace interconnect array 100' further by separating all of the read conductor pairs from all of the write conductor pairs for a substantial distance between the head and the preamplifier/write driver circuitry. Additionally, the large spacing (e.g. 400 µm) between adjacent pairs of read trace conductors and write trace conductors is maintained. The FIG. 6 trace interconnect array 200 incorporates the advantageous geometry of the FIG. 3B example 100 within each conductor pair as well as between adjacent conductor pairs. Further, the FIG. 6 trace interconnect array separates the twelve read conductor pairs into a read conductor pair group 202 on one side of the array, and the twelve write conductor pairs as a write pair conductor group 204 on another side of the array. Because of a need to place same-channel read and write conductor trace pairs adjacent to each other at a head connection end 205 of the trace array 200, plate-thorough vias and bridging traces must be defined on a reverse major surface of a flexible substrate 210 of suitable dielectric material at the head connection end 205, as shown in the enlarged plan view of FIG. 6A of a head connection end of the trace array 200.

Figures 7, 7A:
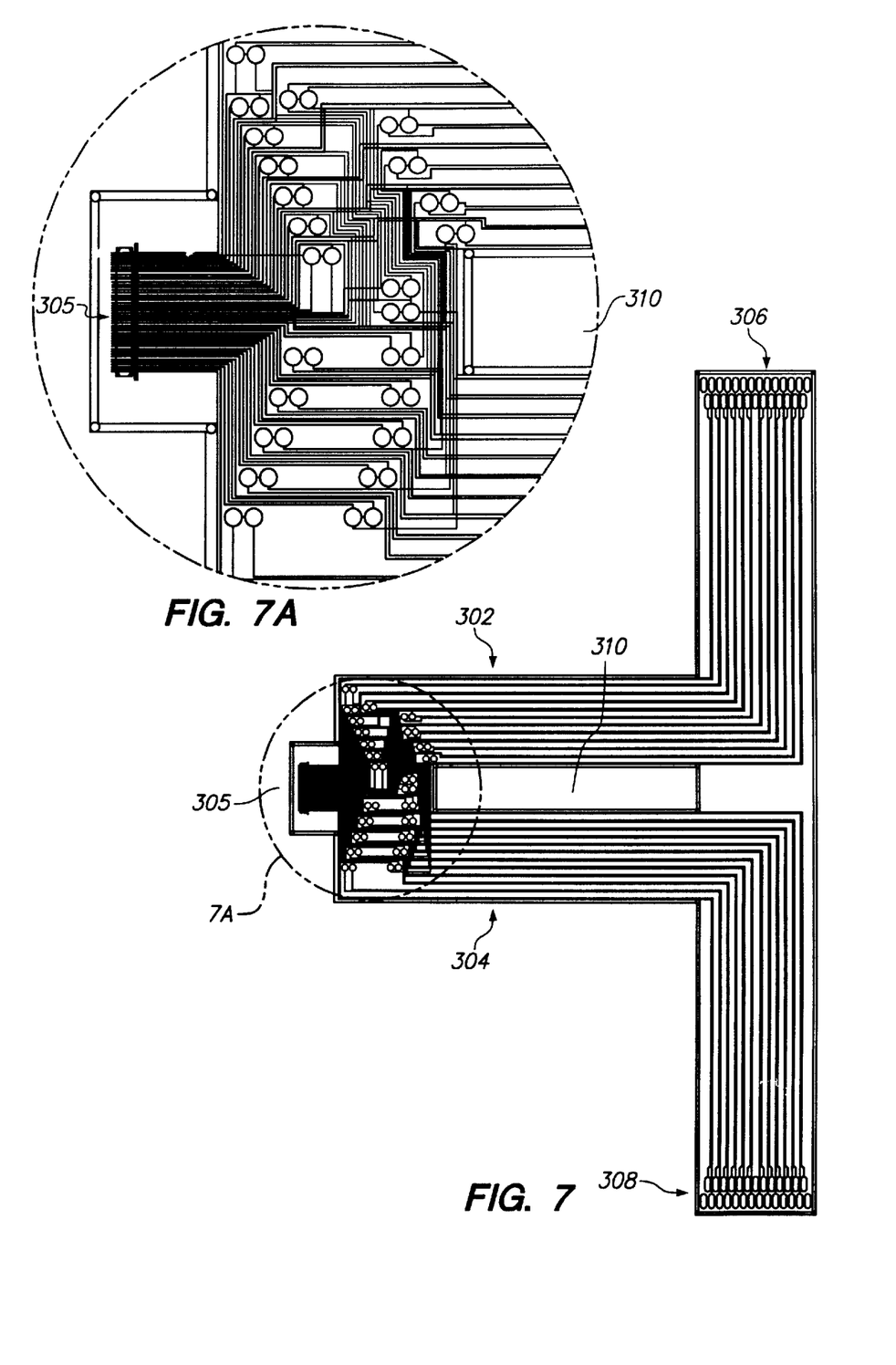
FIG. 7 is an enlarged plan view of a twelve-channel flexible trace interconnect array having read channel pairs grouped together and separated from grouped write channel pairs, and having oppositely extending group connection ends in accordance with principles of the present invention.
FIG. 7A is an enlarged plan view of a head connect portion of the FIG. 7 array.

In some multi-channel tape drive designs it is desirable to separate physically the write driver circuitry from the read preamplifier circuitry. FIG. 7 shows another example of a twelve-channel flexible read/write trace interconnect array 300 formed on a suitable flexible dielectric substrate 310 which is in accordance with principles of the present invention. In the FIG. 7 exemplary trace interconnect array 300 the read conductor pair group 302 is separated from the write conductor pair group 304 at a head connection end 305. At a desired location along a longitudinal extent of the array 300, the conductor pair groups 302 and 304 diverge e.g. transversely and oppositely from each other and terminate at separated circuit connector ends; end 306 being provided for the read pair group 302, and end 308 being provided for the write pair group 304. Preferably as shown in FIG. 7, although not necessarily, the write conductor pair group 304 is symmetrical with the read conductor pair group. A head connection end 310 of the array 300 is shown in the enlarged detail plan view of FIG. 7A.

Thus, it will be appreciated by those skilled in the art that the described approaches are simple to implement, provide controlled electrical parameters including greatly reduced cross-coupling between adjacent channels, and thus eliminate one source of cross talk between channels. This approach thereby improves the performance of each channel of a multiple channel linear tape drive.

Although the present invention has been described in terms of the presently preferred embodiments of multi-channel flexible trace arrays for interconnecting multi-channel tape heads with respective read preamplifier and write driver circuits in a manner reducing adjacent channel cross talk, it should be clear to those skilled in the art that the present invention may also be utilized in conjunction with, for example, other flexible trace interconnect arrays and storage devices, whether disk or tape, and whether magnetic or optical. Thus, it should be understood that the instant disclosure is not to be interpreted as limiting. Various alterations, adaptations, and modifications will no doubt become apparent to those skilled in the art after having read the above disclosure. Accordingly, it is intended that the appended claims be interpreted as covering all such alterations, adaptations and modifications as fall within the true spirit and scope of the invention.

What is claimed is:

1. A flexible multi-channel trace interconnect array comprising: a head end for electrically connecting a plurality of write trace pairs separated into a write pair group and a plurality of read trace pairs separated into a read pair group respectively to write and read elements of a data transducer head; at least one circuit end including (i) a write group circuit connection end, and (ii) a read group circuit connection end for respectively connecting the write pair group and the read pair group respectively to write driver and read preamplifier circuits of a data storage device; and a body formed of a flexible dielectric material; wherein the body is divided into two elongated segments, (i) a write group segment for carrying the write pair group, the write group segment including a write portion, the write portion leading to the write group circuit connection end, the write portion diverging away from the body in a first direction; and (ii) a read, group segment for carrying the read pair group, the read group segment including a read portion, the read portion leading to the read group circuit connection end, the read portion diverging away from the body in a second direction, the write pair group being spaced away from the read pair group; the circuit end for connecting the write and read pairs respectively to write driver and read preamplifier circuits of a data storage device, each trace pair comprising two trace conductors, each conductor having a trace width, and an inter-conductor separation space having a width separating the two trace conductors along the body, adjacent trace pairs being separated by an inter-pair separation space having a width greater than the inter-conductor separation space.

2. The trace interconnect array of claim 1 wherein the data storage device comprises a multi-channel digital linear magnetic tape drive.

3. The trace interconnect array of claim 1 wherein the inter-pair separation space has a width greater than the trace width.

4. The trace interconnect array of claim 3 wherein the trace width of each conductor is approximately 50 µm, the inter-conductor separation width is approximately 50 µm, and the inter-pair separation width is approximately 400 µm.

5. The trace interconnect array of claim 1 wherein the inter-pair separation space has a width dimension lying in a range of approximately two to twenty times the inter-conductor separation width.

6. The trace interconnect array of claim 1 comprising multiple read trace pairs interleaved with multiple write trace pairs.

7. The trace interconnect array of claim 1 wherein the write portion diverges perpendicularly from the body in the first direction and the read portion diverges perpendicularly from the body in the second direction.

8. The trace interconnect array of claim 7 wherein the write group segment portion has a length which is approximately equal to a length of the read group segment portion.

9. Thee trace interconnect array of claim 8 wherein the write group segment is substantially symmetrical to the read group segment.

10. A flexible multi-channel trace interconnect array for connecting a plurality of write elements to a write circuit, and a plurality of read elements to a read circuit of a data storage device, the trace interconnect array comprising:

a body;

a write group secured to the body, the write group having a proximal, write connection end positioned near the write circuit, the write group including a plurality of write pairs; and a read group secured to the body, the read group having a proximal, read connection end positioned near the read circuit, the read group including a plurality of read pairs;

wherein the write group is spaced apart from the read group over a majority of the length of the trace interconnect array and wherein over a majority of the length of the trace interconnect array, no read pairs are positioned between any of the write pairs and no write pairs are positioned between any of the read pairs.

11. The trace interconnect array of claim 10 wherein no read pairs are positioned between any of the write pairs and no write pairs are positioned between any of the read pairs over at least approximately 80 percent of the length of the trace interconnect array.

12. The trace interconnect array of claim 10 wherein each write pair is positioned adjacent to at least one other write pair, and each read pair is positioned adjacent to at least one other read pair.

13. The trace interconnect array of claim 10 wherein the write group includes a write portion positioned near the write connection end, the read group includes a read portion positioned near the read connection end, and the write portion diverges away from the read portion.

14. The trace interconnect array of claim 13 wherein the write portion diverges away from the read group in a first direction.

15. The trace interconnect array of claim 14 wherein the read portion diverges away from the write group in a second direction.

16. The trace interconnect array of claim 15 wherein the first direction is substantially opposite from the second direction.

17. The trace interconnect array of claim 13 wherein the write portion has a length that is approximately equal to a length of the read portion.

18. The trace interconnect array of claim 13 wherein the write portion is substantially symmetrical to the read portion.

19. A data storage unit including the trace interconnect array of claim 10.

20. A flexible multi-channel trace interconnect array for connecting a write element to a write circuit, and a read element to a read circuit of a data storage device, the trace interconnect array comprising:

a body;

a write group secured to the body, the write group electrically connecting the write element to the write circuit, the write group having a proximal, write connection end positioned near the write circuit and a write portion positioned near the write connection end, the write portion including a plurality of adjacent, spaced-apart write pairs secured to the body, each write pair including two write trace conductors, each write trace conductor having a write trace width; wherein the write trace conductors of each write pair are separated by a write inter-conductor separation space; and a read group secured to the body, the read group electrically connecting the read element to the read circuit, the read group having a proximal, read connection end positioned near the read circuit and a read portion positioned near the read connection end, the read portion including a plurality of adjacent, spaced-apart read pairs secured to the body, each read pair including two read trace conductors, each read trace conductor having a read trace width; wherein the read trace conductors of each read pair are separated by a read inter-conductor separation space;

wherein an inter-pair separation space between adjacent pairs is greater than the inter-conductor separation space of the write pairs and the read pairs, and wherein the read portion diverges away from the write portion.

21. The trace interconnect array of claim 20 wherein the inter-pair separation space is at least approximately four times greater than the inter-conductor separation space of each of the write pairs and each of the read pairs.

22. The trace interconnect array of claim 20 wherein the inter-pair separation space is at least approximately ten times greater than the inter-conductor separation space of the write pairs and the read pairs.

23. The trace interconnect array of claim 20 wherein an inter-pair separation space between adjacent pairs is greater than the write trace width and the read trace width.

24. The trace interconnect array of claim 20 wherein the write portion is substantially symmetrical to the read portion.

25. A data storage unit including the trace interconnect array of claim 20.

* * * * *